(12) United States Patent
Lu et al.

(10) Patent No.: US 6,887,023 B1
(45) Date of Patent: May 3, 2005

(54) SCREW WITH PROTRUDING SHEETS ON HEAD PORTION

(76) Inventors: Ying-Kung Lu, 235 P.O. Box 10-69 Chung-Ho, Taipei (TW); Feng-Song Tsai, 235 P.O. Box 10-69 Chung-Ho, Taipei (TW)

( * ) Notice: Subject to any disclaimer, the term of this patent is extended or adjusted under 35 U.S.C. 154(b) by 0 days.

(21) Appl. No.: 10/740,053

(22) Filed: Dec. 19, 2003

(51) Int. Cl.[7] .............................................. F16B 25/10
(52) U.S. Cl. ................................ 411/387.1; 411/387.2; 411/411; 411/424
(58) Field of Search ............................ 411/386–387.8, 411/411–413, 424

(56) References Cited

U.S. PATENT DOCUMENTS

| | | | | |
|---|---|---|---|---|
| 3,665,801 A | * | 5/1972 | Gutshall ................... | 411/387.7 |
| 3,699,841 A | * | 10/1972 | Lanius, Jr. ............... | 411/387.2 |
| 4,028,987 A | * | 6/1977 | Wilson ..................... | 411/387.2 |
| 4,538,486 A | * | 9/1985 | Lutrat ....................... | 81/460 |
| 4,645,396 A | * | 2/1987 | McCauley et al. ....... | 411/387.2 |
| 4,874,278 A | * | 10/1989 | Kawashita ................ | 411/386 |
| 6,739,815 B2 | * | 5/2004 | Takasaki .................. | 411/387.1 |

* cited by examiner

Primary Examiner—William L. Miller

(57) ABSTRACT

A screw with protruding sheets on a head portion comprises a thread portion; a screw tail at one end of the thread portion, a slot formed on the screw tail; a plurality of screwing sheets formed at another end of the thread portion; a plurality of recesses formed between the plurality of screwing sheets for removing undesired pieces; a drilling head being formed at front ends of the screwing sheets; the drilling head formed with a plurality of protruding sheets made of soft metal. By screwing the screw by rotating from the slot, the screw will rotate so as to drill a hole and enter into a wood plate. Then the protruding sheets enlarge the hole. The undesired wood pieces are removed from the recesses. When the screw further drills into a metal plate, the protruding sheet will be worn out because the protruding sheet is made of soft metal.

1 Claim, 7 Drawing Sheets

SCREW WITH PROTRUDING SHEETS ON HEAD PORTION

FIELD OF THE INVENTION

The present invention relates to screws, and particularly to a screw with protruding sheets at a head portion thereof. The screw can remove undesired pieces effectively in the drilling process so that the screws can be drilled quickly with a small power.

BACKGROUND OF THE INVENTION

The prior art protruding sheet screw is not preferred in removing undesired pieces so that the screw tail will be softened due to high temperature in the drilling process. This is because no piece removing guiding recess is formed in the screw. In the prior art, the body of the drill head A (see FIG. 2) is formed with protruding sheets B or protruding sheets C are formed at a distal end of the drilling head A (see FIG. 1). In drilling, the drilling head A is used in drilling, and the protruding sheets serve to enlarge the drilling hole. There are two protruding sheets B, C for enlarging the hole and dissipating heat. Most of the undesired pieces D cannot be removed so as to accumulate on the drilling head A (referring to FIGS. 4 and 5) because no guide recess is designed. Moreover, the drilling work is hard and a longer time is necessary.

SUMMARY OF THE INVENTION

Accordingly, the primary object of the present invention is to provide a screw with protruding sheets at a head portion thereof, wherein the screw can remove undesired pieces effectively so that the screws can be drilled quickly with a small power.

To achieve above object, the present invention provides a screw with protruding sheets on a head portion thereof. The screw comprises a thread portion; a screw tail at one end of the thread portion, a slot formed on the screw tail; a plurality of screwing sheets formed at another end of the thread portion; a plurality of recesses formed between the plurality of screwing sheets for removing undesired pieces; a drilling head being formed at front ends of the screwing sheets; the drilling head formed with a plurality of protruding sheets which are made of soft metal. By screwing the screw from rotating along the slot, the screw will rotate so that the screw drills a hole and enters into a wood plate. Then the protruding sheets will enlarge the hole; and the undesired wood pieces are removed from the recesses. When the screw further drills into a metal plate, the protruding sheet will be worn out because the protruding sheet is made of soft metal.

The various objects and advantages of the present invention will be more readily understood from the following detailed description when read in conjunction with the appended drawing.

DESCRIPTION OF THE PREFERRED EMBODIMENTS

Figure 1:
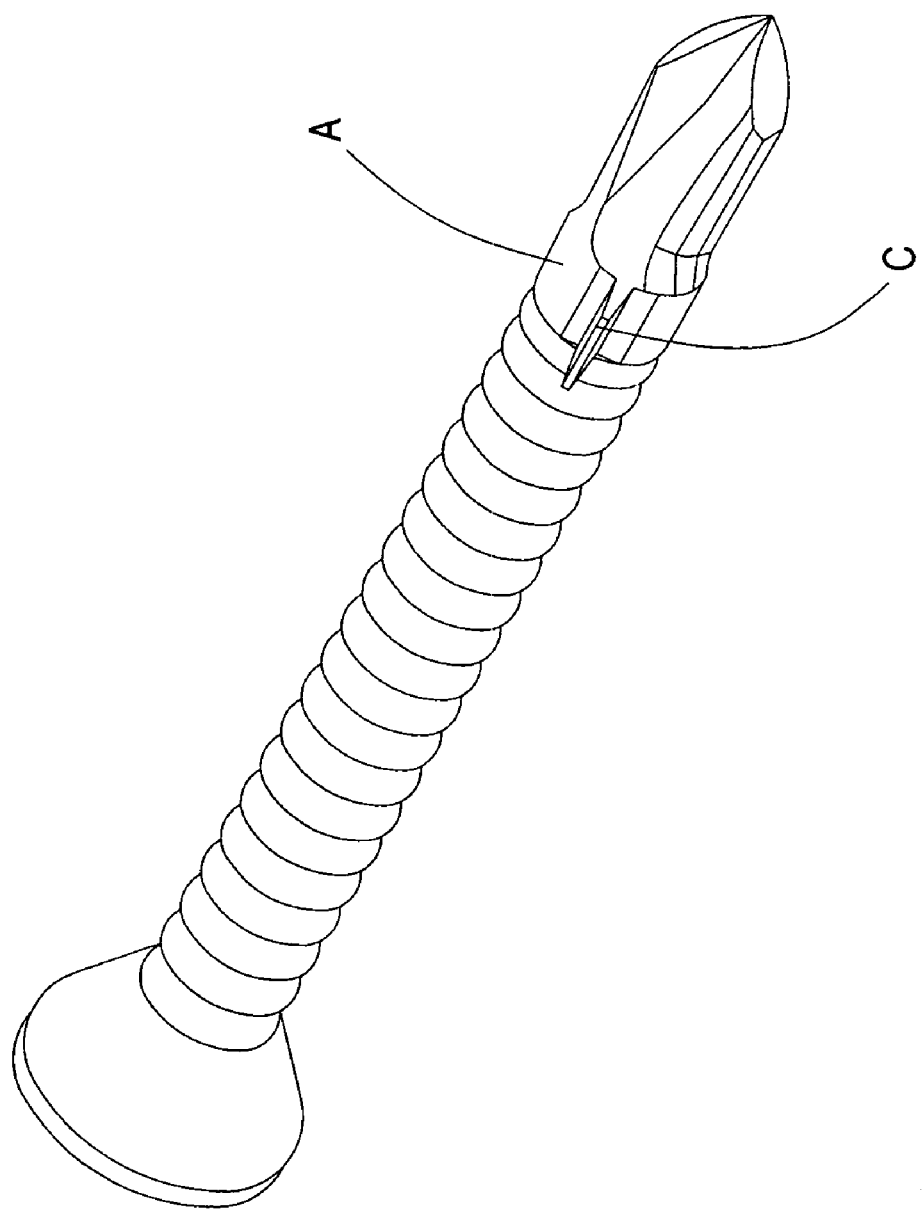
FIG. 1 is a perspective view of the prior art.
Figure 2:
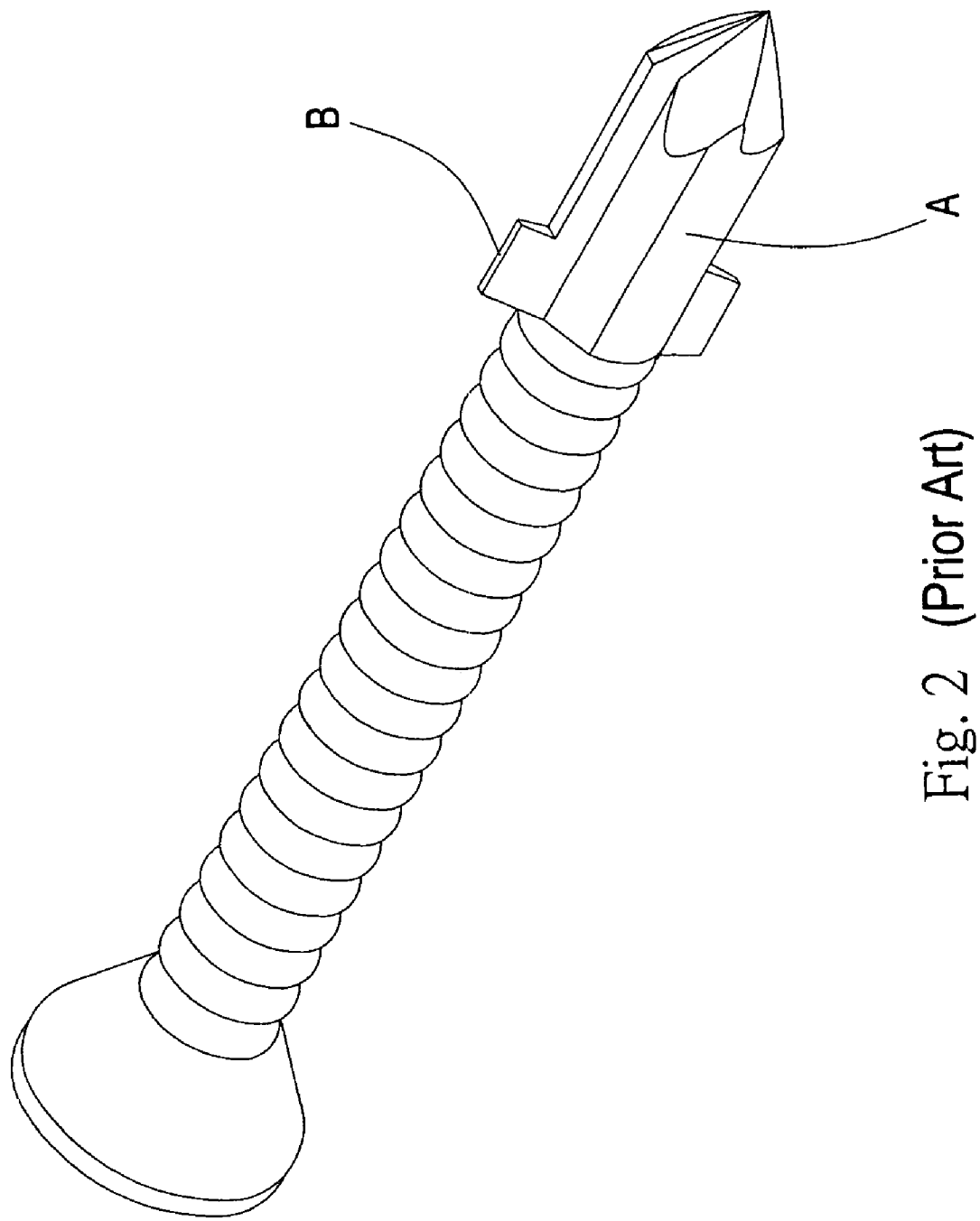
FIG. 2 is a perspective view of another prior art.
Figure 3:
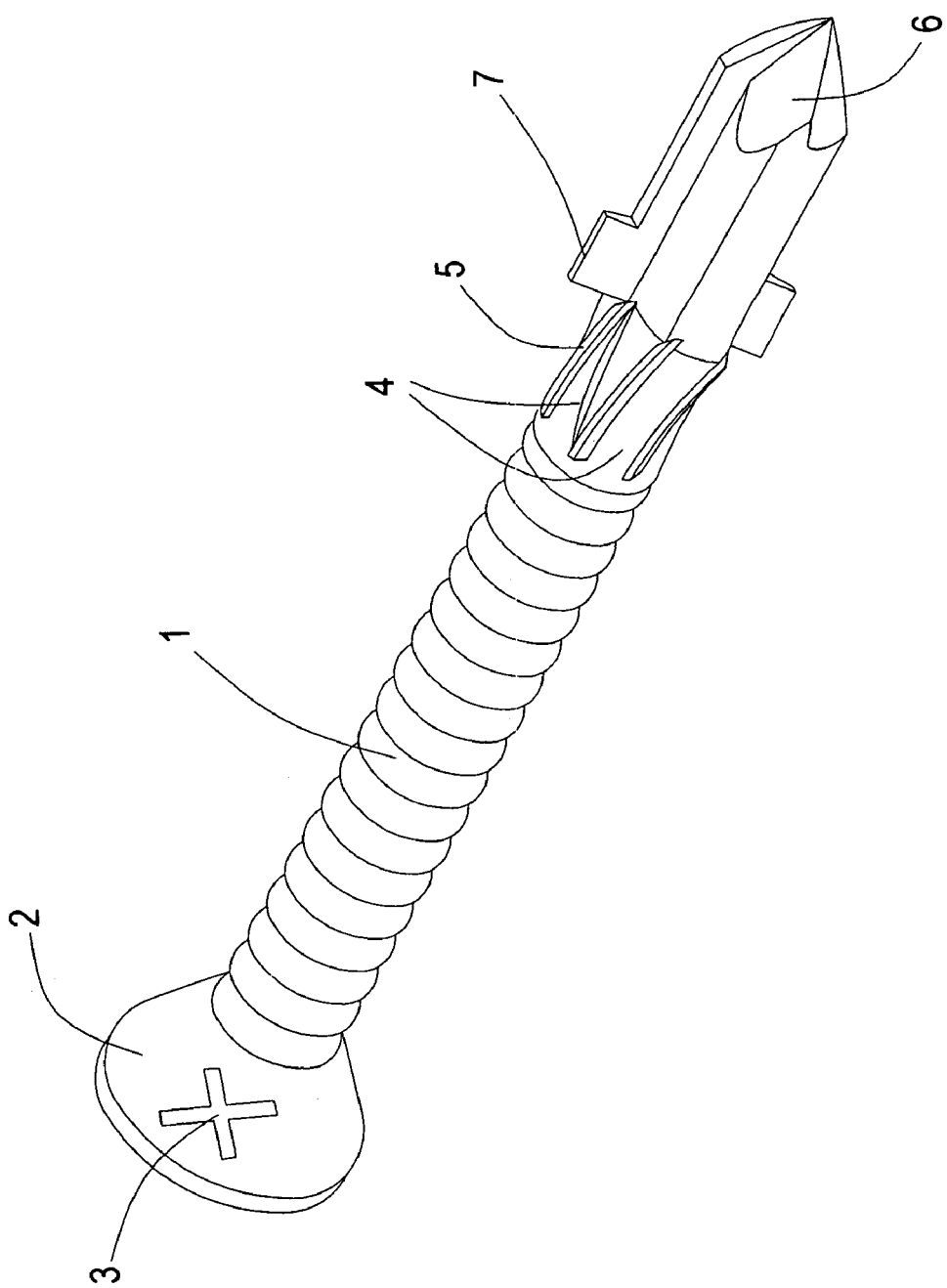
FIG. 3 is a perspective view of the present invention.
Figure 4:
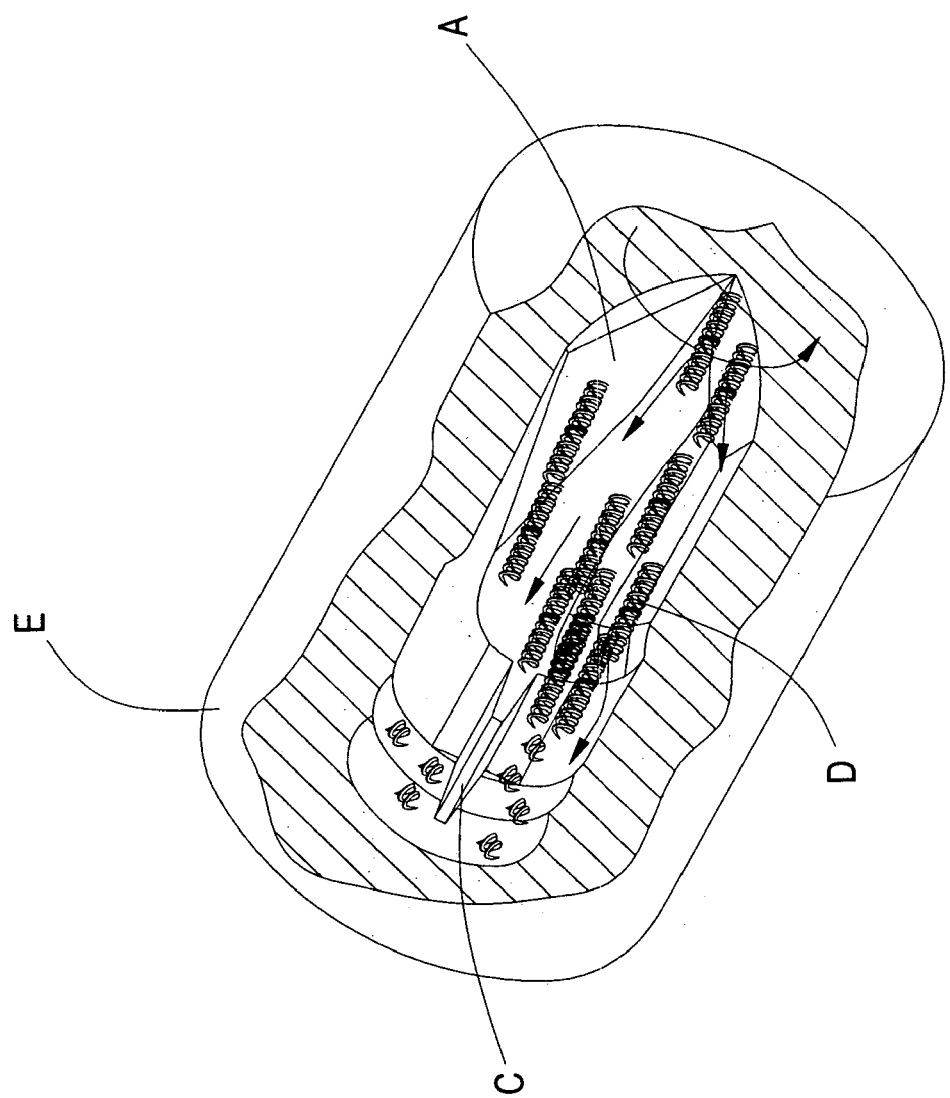
FIG. 4 shows the first prior art about the present invention.
Figure 5:
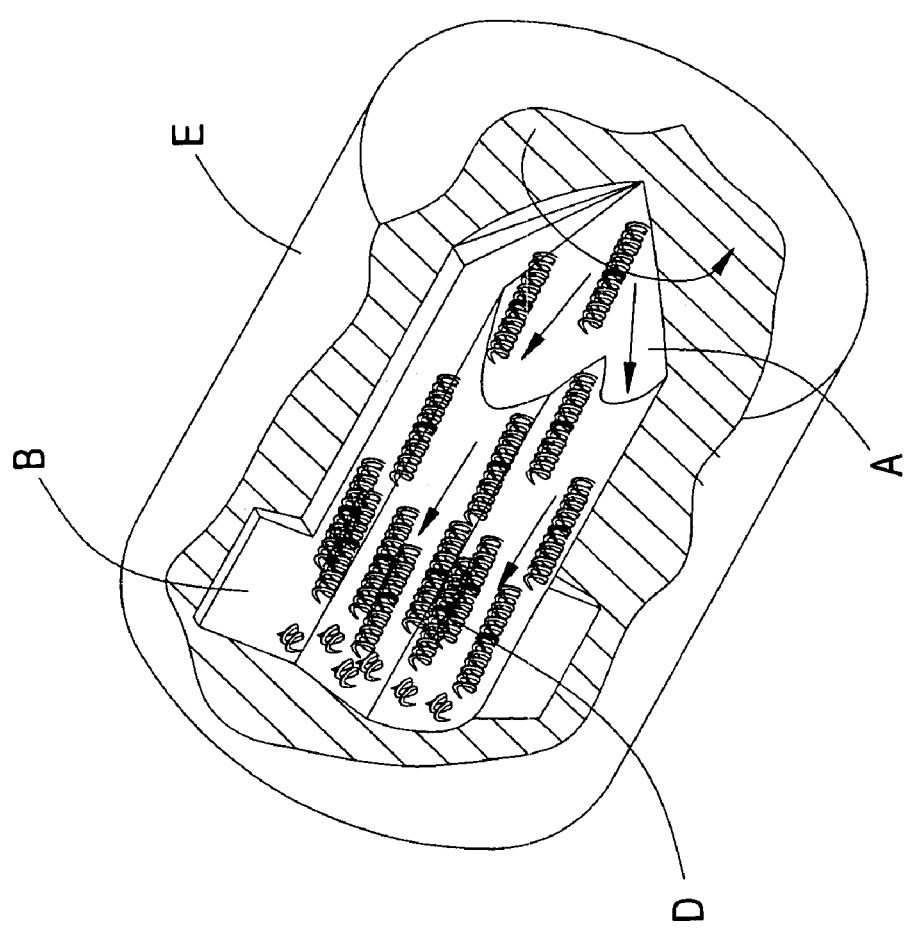
FIG. 5 shows the second prior art about the present invention.
Figure 6:
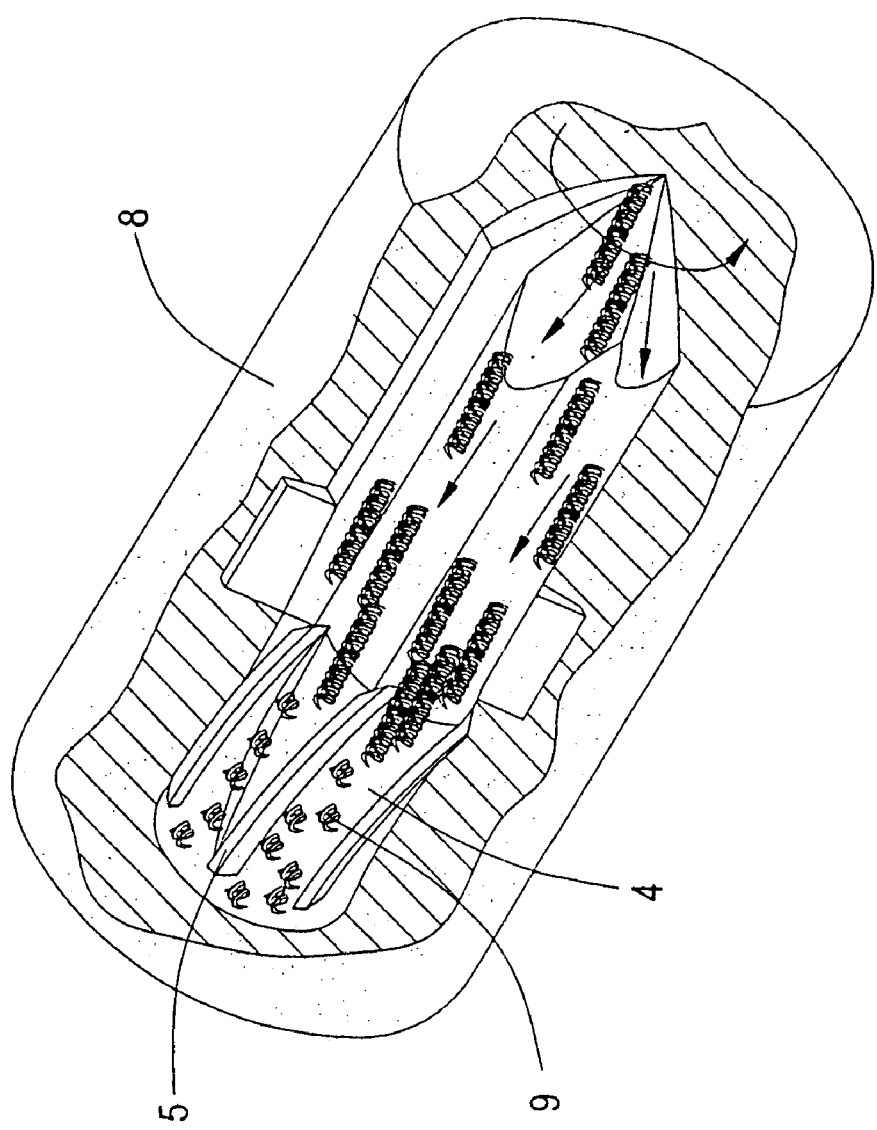
FIG. 6 shows one embodiment of the present invention.
Figure 7:
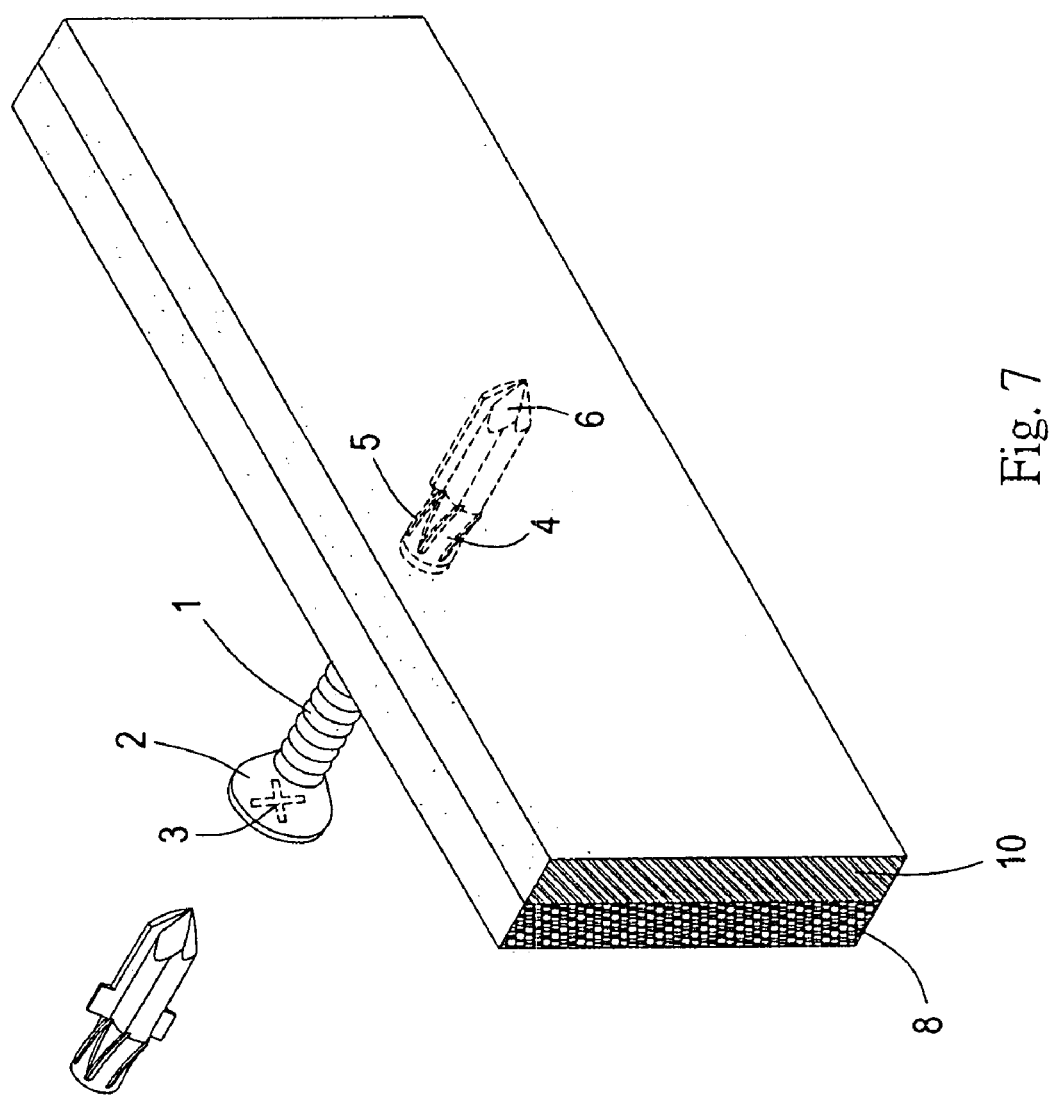
FIG. 7 shows the embodiment of the present invention.

With reference to FIGS. 3, 6 and 7, the screw with protruding sheets of the present invention is illustrated. The present invention can be used to drill a wood plate and a metal plate and then the screw is fixed therein. The present invention includes a thread portion 1; a screw tail 2 at one end of the thread portion 1, a slot 3 is formed on the screw tail 2; a plurality of screwing sheets 5 formed at another end of the thread portion 1 and a plurality of recesses 4 formed between the plurality of screwing sheets 5 for removing undesired pieces. Front ends of the screwing sheets are formed with a drilling head 6. The drilling head 6 is formed with a plurality of protruding sheet 7 from a lateral side thereof. By screwing the slot 3, the screw will rotate so that the screw can drill a hole and enter into a wood plate 8. Then the protruding sheet will enlarge the hole. The undesired wood pieces will be removed from the recesses 4. When the screw drills into a metal plate 10, the protruding sheets will be worn out because the protruding sheets are made of soft metal. Thereby, the screw is beneficial to drill a wood plate. The protruding sheets 7 are axial arranged, and each protruding sheet is protruded with a buckle at a position near the screwing sheets 5;

With reference to FIGS. 6 and 7, in use of the protruding sheet screw of the present invention, the screw is rotated by using a tool and the drilling head 6 will drill into the wood plate 8 and then drill into the metal plate 10. The screw is tightly screwed into the metal by the thread 1 and the undesired wood pieces can be removed by the design of the present invention.

Advantages of the present invention will be described herein. The undesired pieces can be removed. The operation of the present invention is easy with a shorter time period. The cost is low.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A screw with protruding sheets on a drilling head portion thereof, the screw comprising:
   a thread portion;
   a screw tail at one end of the thread portion;
   a cruciform slot formed on the screw tail;
   a plurality of screwing sheets formed at another end of the thread portion;
   a plurality of recesses formed between the plurality of screwing sheets for removing undesired pieces;
   the drilling head being formed at front ends of the screwing sheets; the drilling head formed with a plurality of protruding sheets which are made of soft metal, wherein the protruding sheets are axially arranged, and each protruding sheet is protruded with a buckle at a position near the screwing sheets;
   wherein by screwing the screw by rotating from the slot, the screw will rotate so that the screw drills a hole and enters into a wood plate; then the protruding sheets will enlarge the hole; the undesired wood pieces are removed from the recesses; when the screw further drills into a metal plate, the protruding sheets will be worn out because the protruding sheets are made of soft metal.

* * * * *